United States Patent
Nguyen

(10) Patent No.: US 10,840,795 B1
(45) Date of Patent: Nov. 17, 2020

(54) POWER TRANSISTOR DRIVER WITH REDUCED SPIKES FOR SWITCHING CONVERTERS

(71) Applicant: Monolithic Power Systems, Inc., San Jose, CA (US)

(72) Inventor: James Nguyen, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 16/655,080

(22) Filed: Oct. 16, 2019

(51) Int. Cl.
*H02M 1/08* (2006.01)
*H03K 17/041* (2006.01)
*H02M 3/155* (2006.01)
*H02M 1/00* (2006.01)

(52) U.S. Cl.
CPC ............ *H02M 1/08* (2013.01); *H02M 3/155* (2013.01); *H02M 2001/0054* (2013.01)

(58) Field of Classification Search
CPC .................. H02M 1/08; H02M 1/088; H02M 2001/0029; H03K 17/08104; H03K 17/284; H03K 17/04106
See application file for complete search history.

(56) References Cited

U.S. PATENT DOCUMENTS

| | | | | |
|---|---|---|---|---|
| 7,489,166 | B2 * | 2/2009 | Honda | H03K 17/166 326/82 |
| 7,808,222 | B2 * | 10/2010 | Ueunten | H03K 17/122 323/271 |
| 9,595,952 | B2 * | 3/2017 | Braun | H03K 17/162 |
| 9,866,099 | B1 * | 1/2018 | Assaad | H02M 1/00 |
| 2012/0268091 | A1 * | 10/2012 | Takemae | H03K 17/164 323/272 |
| 2016/0118875 | A1 * | 4/2016 | Lee | H03K 17/161 345/212 |
| 2016/0276956 | A1 * | 9/2016 | Suzuki | H03K 17/56 |
| 2016/0315553 | A1 * | 10/2016 | Ishimaru | H02M 7/219 |
| 2018/0054117 | A1 * | 2/2018 | Nakamura | H03K 17/166 |
| 2019/0199193 | A1 * | 6/2019 | Gloes | H03K 17/163 |
| 2019/0238129 | A1 * | 8/2019 | Fukushima | H02M 7/537 |

* cited by examiner

*Primary Examiner* — Thienvu V Tran
*Assistant Examiner* — Sisay G Tiku
(74) *Attorney, Agent, or Firm* — Perkins Coie LLP

(57) ABSTRACT

A driver for driving a power transistor, the driver having: a first transistor, and a second transistor; wherein (1) when the first transistor is turned on, the second transistor is simultaneously turned on, and wherein after the second transistor remains on for a first time period, the second transistor is turned off for a second time period during when a switching voltage at a second terminal of the power transistor is rising, and the second transistor is turned on after the second time period is over; and (2) when the first transistor is turned off, the second transistor is simultaneously turned off.

10 Claims, 4 Drawing Sheets

POWER TRANSISTOR DRIVER WITH REDUCED SPIKES FOR SWITCHING CONVERTERS

TECHNICAL FIELD

The present invention relates generally to switching converters and, more particularly, to driver circuit for driving a power transistor used with switching converters.

BACKGROUND

In a switching converter, a driver with high load drivability is preferred to fast turn on and off a power transistor, so as to reduce switching loss. However, driver with high load drivability creates high SW voltage spikes due to parasitic elements connected to a switching node of the switching converter.

FIG. 1 shows a prior art switching converter 10 having a driver 101, power transistors PM1 and PM2. As shown in FIG. 1, there is a parasitic inductance Lpar presented between an input voltage Vin and a switching node SW. When the power transistor PM1 is turned on, high voltage spikes will appear at the switching node SW due to the parasitic inductance Lpar. Therefore, a breakdown voltage of the power transistor PM2 needs to be high enough to withstand the high voltage spikes at the switching node SW, which will increase the cost and affect the performance of the switching converter. Furthermore, high voltage spikes at the switching node SW also could cause EMI (Electro-Magnetic Interference) to the nearby circuit.

SUMMARY

It is an object of the present invention to provide a driver to drive a power transistor of a switching converter with fast speed and decreased voltage spike when the power transistor is turned on.

In accomplishing the above objective, there has been provided, in accordance with an embodiment of the present invention, a driver for driving a power transistor having a control terminal, a first terminal and a second terminal, the driver comprising: a first transistor, having a control terminal configured to receive a first driving signal, a first terminal coupled to a power source, a second terminal coupled to the control terminal of the power transistor; and a second transistor, having a control terminal configured to receive a second driving signal, a first terminal coupled to the power source, and a second terminal coupled to the control terminal of the power transistor; wherein (1) when the first transistor is turned on, the second transistor is simultaneously turned on, and wherein after the second transistor remains on for a first time period, the second transistor is turned off for a second time period during when a switching voltage at the second terminal of the power transistor is rising, and the second transistor is turned on after the second time period is over; and (2) when the first transistor is turned off, the second transistor is simultaneously turned off.

In accomplishing the above objective, there has been provided, in accordance with an embodiment of the present invention, a switching converter, comprising: a first power transistor, having a control terminal configured to receive a power control signal, a first terminal configured to receive an input voltage, and a second terminal coupled to a switching node of the switching converter; a driver having a first input terminal configured to receive a first driving signal, a second input terminal configured to receive a second driving signal, and an output terminal configured to provide the power control signal to the control terminal of the first power transistor, wherein the driver comprises a first transistor turned on and off by the first driving signal, and a second transistor turned on and off by the second driving signal; wherein, (1) when the first transistor is turned on, the second transistor is simultaneously turned on, and wherein after the second transistor remains on for a first time period, the second transistor is turned off for a second time period during when a switching voltage at the second terminal of the power transistor is rising, and the second transistor is turned on after the second time period is over; and (2) when the second transistor is turned off, the second transistor is simultaneously turned off.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

FIG. 1 shows a prior art switching converter having driver 101, power transistors PM1 and PM2.

FIG. 2 schematically shows a driver 20 for driving a power transistor PM1 in accordance with an embodiment of the present invention.

Figure 3:
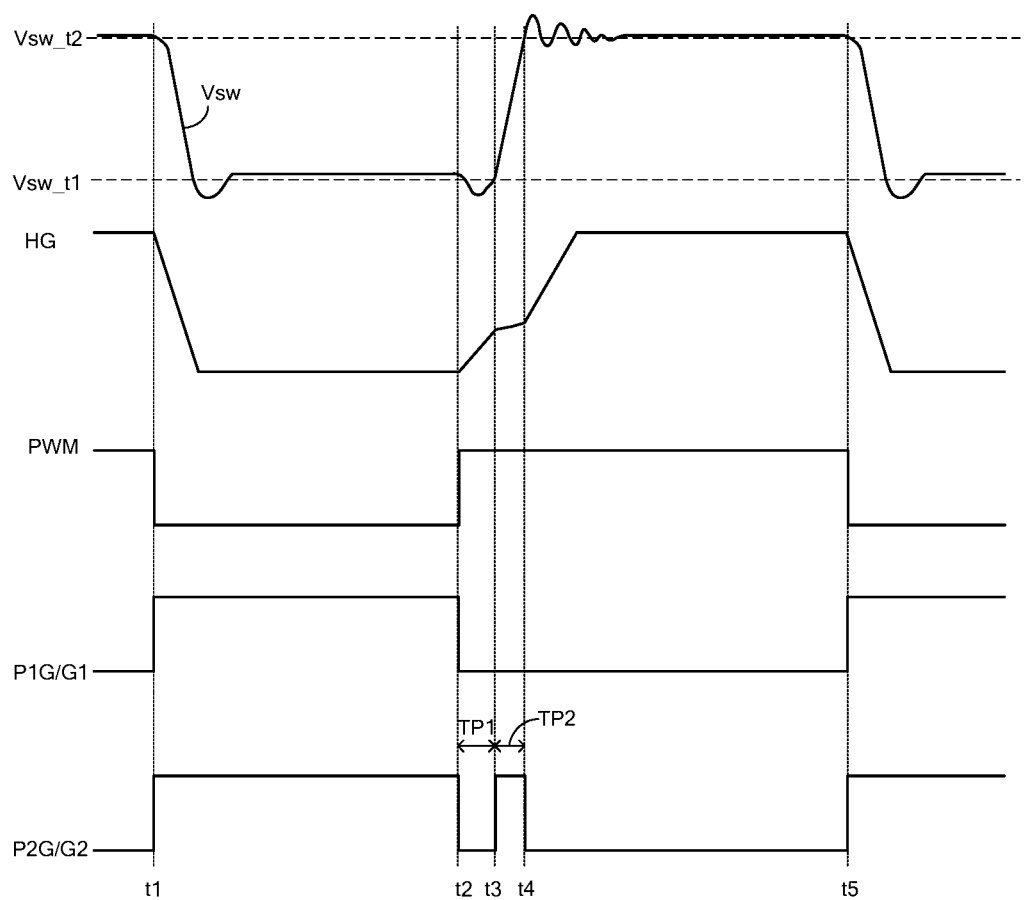
FIG. 3 shows waveforms of the switching voltage Vsw, the driving control signals G1 and G2, and the driving signals P1G and P2G in the example of FIG. 2 in accordance with an embodiment of the present invention.

The use of the same reference label in different drawings indicates the same or like components.

DETAILED DESCRIPTION

The following description provides exemplary embodiments of the technology. One skilled in the art will understand that the technology may be practiced without some or all of the features described herein. In some instances, well known structures and functions have not been shown or described in detail to avoid unnecessarily obscuring the description of the embodiments of the technology. In some instances, similar structures and functions that have been described in detail for other embodiments are not been described in detail for such embodiments to simplify and make clear understanding of the embodiments. It is intended that the terminology used in the description presented below be interpreted in its broadest reasonable manner, even though it is being used in conjunction with a detailed description of certain embodiments of the technology.

Figures 1, 2:
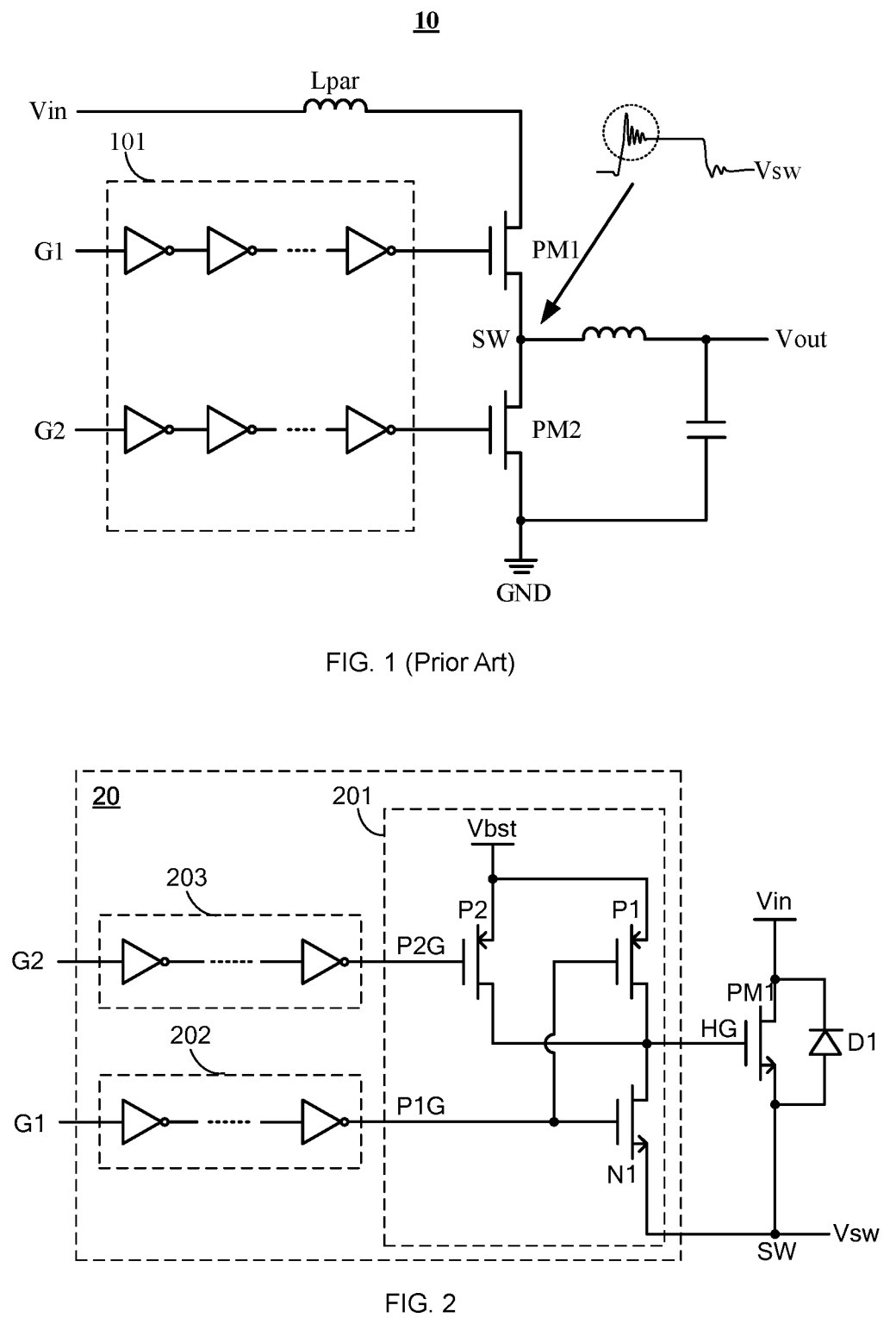

FIG. 2 schematically shows a driver 20 for driving a power transistor PM1 in accordance with an embodiment of the present invention. The power transistor has a control terminal configured to receive a power control signal HG, a first terminal configured to receive an input voltage Vin, and a second terminal coupled to a switching node SW of a switching converter, e.g., the switching converter 10 shown in FIG. 1. The driver 20 could be used with any switching circuit having at least one power transistor turned on and off frequently, such as a BUCK converter shown in FIG. 1. As shown in FIG. 2, the driver 20 comprises: a first transistor P1, having a control terminal configured to receive a first driving signal P1G, a first terminal coupled to a power source Vbst, a second terminal coupled to the control terminal of the power transistor PM1; and a second transistor P2, having a control terminal configured to receive a second driving signal P2G, a first terminal coupled to the power source Vbst, and a second terminal coupled to the control terminal of the power transistor PM1; wherein (1) when the first transistor P1 is turned on, the second transistor P2 is simultaneously turned on, and wherein after the second transistor P2 remains on for a first time period TP1, the second transistor P2 is turned off for a second time period TP2 during when a switching voltage Vsw at the second terminal of the power transistor PM1 is rising, and the second transistor P2 is turned on after the second time period TP2 is over; (2) when the first transistor P1 is turned off, the second transistor P2 is simultaneously turned off. In one embodiment, the second transistor P2 has a higher current drivability than the first transistor P1. It should be known that when a transistor has a higher current drivability, it means that the transistor has a larger W/L ratio, wherein W is a channel width of the transistor and L is a channel width of the transistor.

In the example of FIG. 2, the driver 20 further comprises a third transistor N1, having a control terminal configured to receive the first driving signal P1G, a first terminal coupled to the second terminal of the first transistor P1 and the second terminal of the second transistor P2, and a second terminal coupled to the second terminal of the power transistor PM1, i.e., the switching node SW. In one embodiment, the first transistor P1 comprises a P-type MOSFET (Metal Oxide Semiconductor Field Effect Transistor), and the second transistor N1 comprises a N-type MOSFET. The first transistor P1 and the second transistor N1 are coupled as an inverter, and are turned on and off alternately.

In the example of FIG. 2, the driver 20 further comprises: a first plurality of inverters 202 coupled in a way that an output terminal of a pre-stage inverter coupled to an input terminal of an adjacent post-stage inverter, wherein the first plurality of inverters 202 is configured to receive a first driving control signal G1, and to provide the first driving signal P1G with enhanced load drivability to the control terminal of the first transistor P1; and a second plurality of inverters 203 coupled in a way that an output terminal of a pre-stage inverter coupled to an input terminal of an adjacent post-stage inverter, wherein the second plurality of inverters 203 is configured to receive a second driving control signal G2, and to provide the second driving signal P2G with enhanced load drivability to the control terminal of the second transistor P2. In other words, the first driving signal P1G has a higher load drivability than the first driving control signal G1, and the second driving signal P2G has a higher load drivability than the second driving control signal G2. The first driving signal P1G may have a same phase or an inverting phase with the first driving control signal G1, and the second driving signal P2G may have a same phase or an inverting phase with the second driving control signal G2, depending on the application requirements. In the embodiments of the present invention, the first driving signal P1G has a same phase with the first driving control signal G1, and the second driving signal P2G has a same phase with the second driving control signal G2

FIG. 3 shows waveforms of the switching voltage Vsw, the driving control signals G1 and G2, and the driving signals P1G and P2G in the example of FIG. 2 in accordance with an embodiment of the present invention. The operation of the driver 20 will be illustrated with reference to FIGS. 2 and 3.

The power transistor PM1 in the example of FIG. 2 comprises a N-type MOSFET. As persons of ordinary skill in the art know that the N-type MOSFET is turned on by a high voltage larger than a threshold of the N-type MOSFET, and is turned off by a voltage lower than the threshold of the MOSFET. The P-type MOSFET is the opposite. In the example of FIG. 2, when the driving signals P1G and P2G go to logic 1 at time t1, the transistors P1 and P2 are turned off. When the driving signals P1G and P2G go to logic 0 at time t2, the transistors P1 and P2 are turned on to pull the power control signal HG up. As a result, the power transistor PM1 is turned on when the power control signal HG reaches a threshold of the power transistor PM1. Due to the characteristics of the synchronous switching converter, e.g., the buck converter shown in FIG. 1, there will be an undershoot right after the power transistor PM1 is turned on. At time t3, the undershoot is over, and the switching voltage Vsw is rising. In one embodiment of the present invention, the second transistor P2 is turned off during when the switching voltage Vsw is rising, i.e., during the second time period TP2 as shown in FIG. 3. As a result, a slew rate dv/dt of the power control signal HG is slow during the second time period TP2, and the voltage spikes present at the switching voltage Vsw decreases as shown in FIG. 3. When the second time period TP2 is over, the second transistor P2 is turned on again at time t4 for fully enhancing the power transistor PM1. The driving signals P1G and P2G both go to logic 1 at time t5 to turn off the transistors P1 and P2, as well as the power transistor PM1.

As mentioned before, the second transistor P2 has higher current drivability than the first transistor P1, i.e., the second transistor P2 has larger W/L ratio than the first transistor P1. When the first transistor P1 and the second transistor P2 are both turned on at time t2, because of the high current drivability of the second transistor P2, the dead time and the recovery time of a body diode D1 of the power transistor PM1 are short, which assure a quick turn on of the power transistor PM1. After the first time period TP1, the charges in the body diode D1 of the power transistor PM1 are approximately removed. Then when the switching voltage Vsw reaches a first switching voltage threshold Vsw_t1 at time t3, the second transistor P2 is turned off while the first transistor P1 remains on. In this way, the power control signal HG keeps rising with slow slew rate dv/dt to minimize the voltage spikes at the switching node SW. After the second time period TP2, i.e., at time t4, the switching voltage Vsw reaches a second switching voltage threshold Vsw_t2, then the second transistor P2 is turned on again to fully enhance the power transistor PM1.

In one embodiment, a value of the first switching voltage threshold Vsw_t1 may be approximately zero, and a second switching voltage threshold Vsw_t2 may be approximately the value of the input voltage Vin. In non-synchronous switching converter, the undershoot of the switching voltage at the time the power transistor is turned on may not exist.

Thus, the first switching voltage threshold Vsw_t1 may have a value larger than zero. Persons of ordinary skill in the art could choose the appropriate values for the first switching voltage threshold Vsw_t1 and the second switching voltage threshold Vsw_t2 according to the application, with understanding of the present invention.

Figure 4:
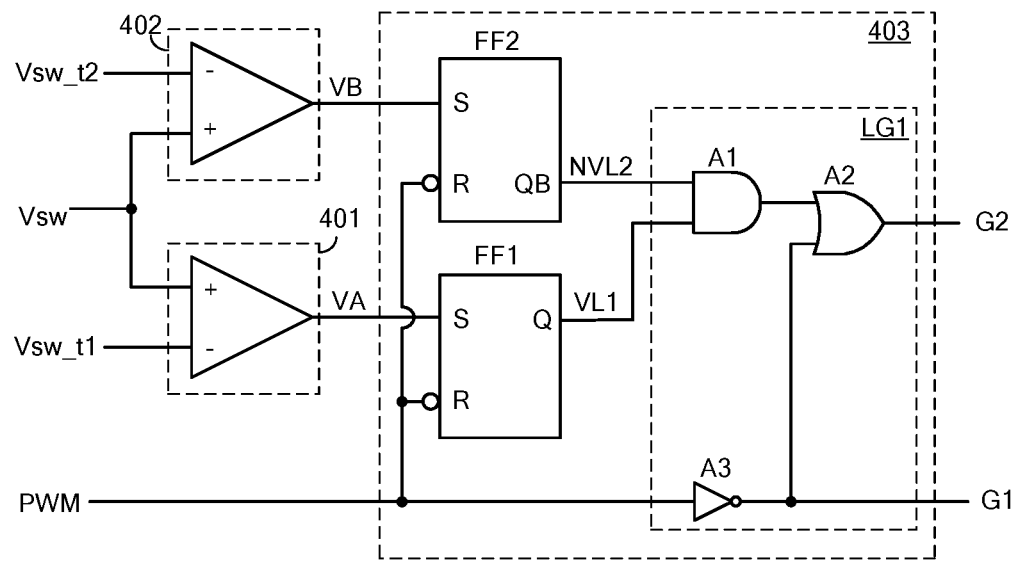
FIG. 4 schematically shows a driving control signal generating circuit 40 in accordance with an embodiment of the present invention.

FIG. 4 schematically shows a driving control signal generating circuit 40 in accordance with an embodiment of the present invention. The driving control signal generating circuit 40 comprises: a first threshold circuit 401, configured to receive the switching voltage Vsw at the second terminal of the power transistor PM1 and the first switching voltage threshold Vsw_t1, and to provide a first threshold detecting signal VA based on the switching voltage Vsw and the first switching voltage threshold Vsw_t1; a second threshold circuit 402, configured to receive the switching voltage Vsw and the second switching voltage threshold Vsw_t2, and to provide a second threshold detecting signal VB based on the switching voltage Vsw and the second switching voltage threshold Vsw_t2; and a logic circuit 403, having a first input terminal configured to receive the first threshold detecting signal VA, a second input terminal configured to receive the second threshold detecting signal VB, and a third input terminal configured to receive a switching control signal PWM, and to provide the first driving control signal G1 based on performing a logic operation to the switching control signal PWM, and to provide the second driving control signal G2 based on performing a logic operation to the first threshold detecting signal VA, the second threshold detecting signal VB and the switching control signal PWM.

In the example of FIG. 4, the first threshold circuit 401 and the second threshold circuit 402 comprise a comparator respectively.

In the example of FIG. 4, the logic circuit 403 comprises: a first RS latch FF1, having a set terminal "S" configured to receive the first threshold detecting signal VA, a reset terminal "R" configured to receive the switching control signal PWM, and an output terminal "Q" configured to provide a first latch output signal VL1; a second RS latch FF2, having a set terminal "S" configured to receive the second threshold detecting signal VB, a reset terminal "R" configured to receive the switching control signal PWM, and an output terminal "QB" configured to provide a second latch output signal NVL2; and a logic gate circuit LG1, configured to receive the first latch output signal VL1, the second latch output signal NVL2, the switching control signal PWM, wherein the logic gate circuit LG1 provides the first driving control signal G1 based on the switching control signal PWM, and provides the second driving control signal G2 based on performing a logic operation to the first latch output signal VL1, the second latch output signal NVL2 and the switching control signal PWM.

In the example of FIG. 4, the logic gate circuit LG1 comprises an AND gate A1, an OR gate A2, and an inverter A3. The AND gate A1 receives the first latch output signal VL1 and the second latch output signal NVL2, and provides an output signal to the OR gate A2. The OR gate A2 receives the output signal from the AND gate A1, and an inverting signal of the switching control signal PWM, and then provides the second driving control signal G2. The switching control signal PWM is inverted to be the first driving control signal G1 via the inverter A3. Thus the first driving control signal G1 has an opposite phase with the switching control signal PWM.

The switching control signal PWM could be generated by prior art control circuits known to persons of ordinary skill in the art, e.g., peak current control switching circuit, voltage control switching circuit.

The operation of the driving control signal generating circuit 40 will be illustrated with reference to FIGS. 3 and 4. As shown in FIG. 3, at time t1, the switching control signal PWM goes to logic 0. Then the RS latches FF1 and FF2 are reset, and the first latch output signal VL1 goes to logic 0 while the second latch output signal NVL2 goes to logic 1, i.e., VL1=0 and NVL2=1. Thus, the output signal of the AND gate A1 will be logic 0. An output signal of the inverter A3, i.e., the first driving control signal G1, is logic 1 at this time. As a result, the second driving control signal G2 is set to logic 1 after the OR gate A2. Thus, the first transistor P1 and the second transistor P2 are turned off at time t1 when the driving control signals G1 and G2 go to logic 1. At time t2, the switching control signal PWM goes to logic 1, and the first driving control signal G1 go to logic 0. At this time, the first latch output signal VL1 keeps logic 0 while the second latch output signal NVL2 keeps logic 1. Thus, the output signal of the AND gate A1 is still logic 0. The first driving control signal G1 is logic 0 at this time. As a result, the second driving control signal G2 is set to logic 0, and the first transistor P1 and the second transistor P2 are turned on at time t2. Then, the power control signal HG at the control terminal of the power transistor PM1 is pulled up to turn on the power transistor PM1. As a result, the switching voltage Vsw increases after an undershoot as shown in FIG. 3. After a first time period TP1, i.e., at time t3, the switching voltage Vsw increases to the first switching voltage threshold Vsw_t1, and the first threshold detecting signal VA flips to logic 1 to set the first latch output signal VL1 to logic 1. At this time, the second latch output signal NVL2 keeps logic 1. Thus, the output signal of the AND gate A1 turns to logic 1, and sets the second driving control signal G2 to logic 1 via the OR gate A2. From the time t3 to the time t4, i.e., during second time period TP2, the switching voltage Vsw keeps rising, and reaches the second switching voltage threshold Vsw_t2 at time t4. Consequently, the second threshold detecting signal VB flips to logic 1 to set the RS latch FF1, and the second latch output signal NVL2 flips to logic 0, which turns the output signal of the AND gate A1 to logic 0. At time t5, the switching control signal PWM flips to logic 0, and sets the driving control signals G1 and G2 to logic 1 via the inverter A3 and the OR gate A2. Then another switching cycle begins and the operation repeats as shown in FIG. 3.

As can be seen from FIG. 3, the power control signal HG has different slew rate dv/dt during different time periods. In some embodiments, the second driving control signal G2 could be determined according to the power control signal HG.

Figure 5:
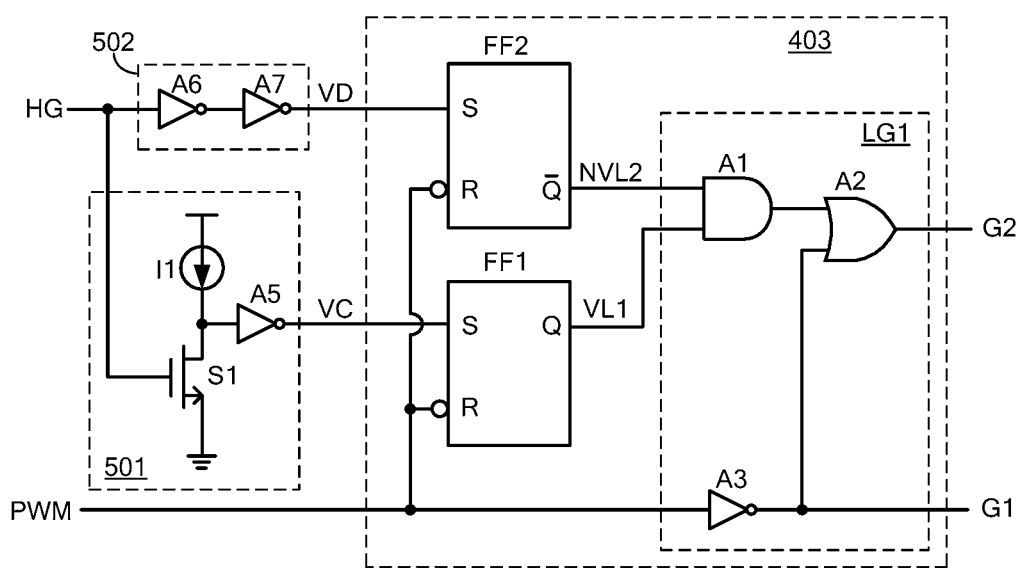
FIG. 5 schematically shows a driving control signal generating circuit 50 in accordance with an embodiment of the present invention.

FIG. 5 schematically shows a driving control signal generating circuit 50 in accordance with an embodiment of the present invention. The driving control signal generating circuit 50 comprises: a first threshold circuit 501, having an input terminal configured to receive the power control signal HG, an output terminal configured to provide a first threshold detecting signal VC; a second threshold circuit 502, having an input terminal configured to receive the power control signal HG, an output terminal configured to provide a second threshold detecting signal VD; and the logic circuit 403, having the first input terminal configured to receive the first threshold detecting signal VC, the second input terminal configured to receive the second threshold signal VD, the third input terminal configured to receive the switching control signal PWM, and to provide the first driving control signal G1 based on performing a logic operation to the switching control signal PWM, and to provide the second driving control signal G2 based on performing a logic operation to the first threshold detecting signal VC, the second threshold detecting signal VD and the switching control signal PWM.

In the example of FIG. 5, the first threshold detecting circuit 501 comprises: a current source 11, configured to provide a current; and a switch S1, configured to receive the current provided by the current source 11, wherein the switch S1 has a control terminal configured to receive the power control signal HG. In FIG. 5, the first threshold detecting circuit 501 further comprises an inverter A5, having an input terminal coupled to a connection node of the current source 11 and the switch S1, and an output terminal configured to provide the first threshold detecting signal VC. When the power control signal HG is lower than a threshold of the switch S1, the switch S1 is turned off, and the first threshold detecting signal VC is logic 0. When the power control signal HG is higher than the threshold of the switch S1, the switch S1 is turned on, and pull the first threshold detecting signal VC to logic 1, so as to set the first RS latch FF1. Persons of ordinary skill could choose the switch S1 with a demanded threshold corresponding to the value of the power control signal HG when at time t2.

In the example of FIG. 5, the second threshold detecting circuit 502 comprises at least one inverter coupled in a way that an output of a pre-stage inverter coupled to an input of an adjacent post-stage inverter. As show in FIG. 5, the second threshold detecting circuit 502 comprises two inverters A6 and A7. When the power control signal HG is lower than a threshold of the inverter A6, the second threshold detecting signal VD is logic 0. When the power control signal HG increases to the threshold of the inverter A6, the inverters A6 and A7 flip, and the second threshold detecting signal VD turns to be logic 1, and sets the second RS latch FF2. Persons of ordinary skill in the art could choose the inverter with a demanded threshold corresponding to the value of the power control signal HG when at time t3, to receive the power control signal HG.

The operation of the driving control signal generating circuit 50 will be illustrated with reference to FIGS. 3 and 5. As shown in FIG. 3, at time t1, the switching control signal PWM goes to logic 0, and the first driving control signal G1 goes to logic 1. Then the latches FF1 and FF2 are reset, and the first latch output signal NVL1 flips to logic 1 while the second latch output signal VL2 flips to logic 0, i.e., NVL1=1 and VL2=0. Thus, the output signal of the AND gate A1 will be 0. An output signal of the inverter A3, i.e., the first driving control signal G1, is logic 1 at this time. As a result, the second driving control signal G2 is set to logic 1 after the OR gate A2. Thus, the first transistor P1 and the second transistor P2 are turned off at time t1. At time t2, the switching control signal PWM goes to logic 1, and the first driving control signal G1 goes to logic 0. At this time, the first latch output signal VL1 keeps logic 0 while the second latch output signal NVL2 keeps logic 1. Thus, the output signal of the AND gate A1 is still logic 0. As a result, the second driving control signal G2 is set to logic 0. As a result, the first transistor P1 and the second transistor P2 are turned on at time t2. Then, the power control signal HG at the control terminal of the power transistor PM1 is pulled up to turn on the power transistor PM1. When the power control signal HG increases to the threshold of the MOSFET S1 at time t3, the first threshold detecting signal VA flips to logic 1, and sets the first latch output signal VL1 to logic 1. At this time, the second latch output signal NVL2 keeps logic 1. Thus, the AND gate A1 provides a logic 1 output voltage, and turns the second driving control signal G2 to logic 1 via the OR gate A2. From the time t3 to the time t4, the power control signal HG increases with a slow slew rate dv/dt. About at time t4, the power control signal HG reaches the threshold of the inverter A6. As a result, the second threshold detecting signal VD flips to logic 1 to set the RS latch FF2, and the second latch output signal NVL2 flips to logic 0, which turns the output signal of the AND gate A1 to logic 0. Then the second driving control signal G2 is set to be logic 0 again via the OR gate A2. At time t5, the switching control signal PWM flips to logic 0, and sets the driving control signals G1 and G2 to logic 1 via the inverter A3, and the OR gate A2. Then another switching cycle begins and the operation repeats as shown in FIG. 3.

Figure 6:
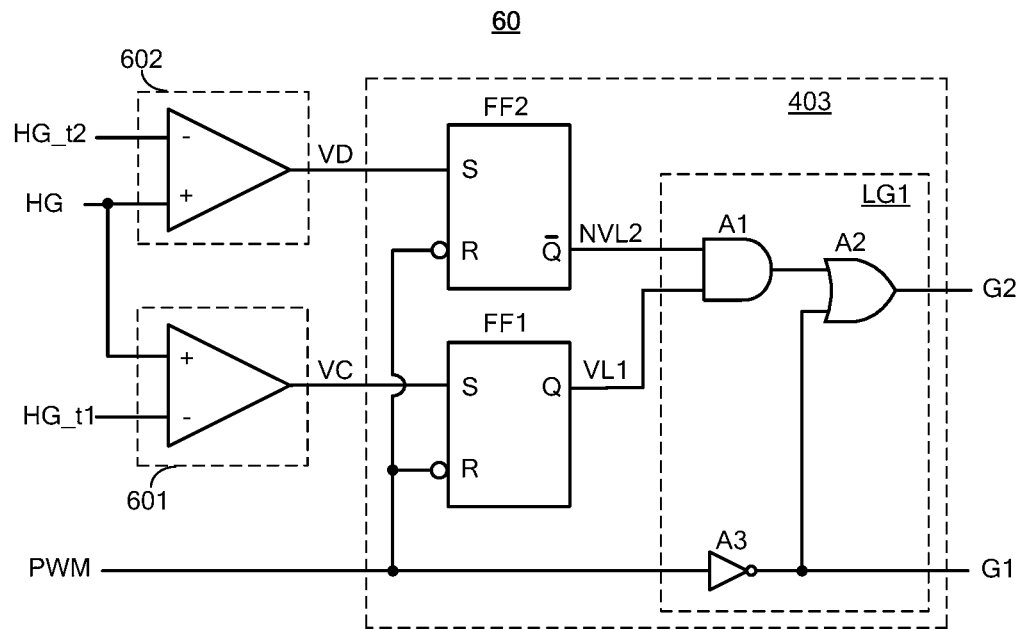
FIG. 6 schematically shows a driving control signal generating circuit 60 in accordance with an embodiment of the present invention.

FIG. 6 schematically shows a driving control signal generating circuit 60 in accordance with an embodiment of the present invention. Different from the driving control signal generating circuit 50 in FIG. 5, a first threshold circuit 601 and a second threshold circuit 602 comprises a comparator respectively. In the example of FIG. 6, the first threshold circuit 601 has a first input terminal configured to receive the power control signal HG, a second input terminal configured to receive a first power control threshold signal HG_t1, and an output terminal configured to provide the first threshold detecting signal VC based on a comparing result of the power control signal HG and the first power control threshold signal HG_t1. The second threshold circuit 602 has a first input terminal configured to receive the power control signal HG, a second input terminal configured to receive a second power control threshold signal HG_t2, and an output terminal configured to provide the second threshold detecting signal VD based on a comparing result of the power control signal HG and the second power control threshold signal HG_t2. In one embodiment, the first power control threshold signal HG_t1 has a value corresponding to the value of the power control signal HG when at time t2, and the second power control threshold signal HG-T2 has a value corresponding to the value of the power control signal HG when at time t3.

It should be understood that in other embodiments, other circuits that could perform the comparing function could be used as the first threshold circuit and the second threshold circuit.

The operation of the circuit in FIG. 6 is similar to the operation of the circuit in FIG. 4, and is not described here for brevity.

Figure 7:
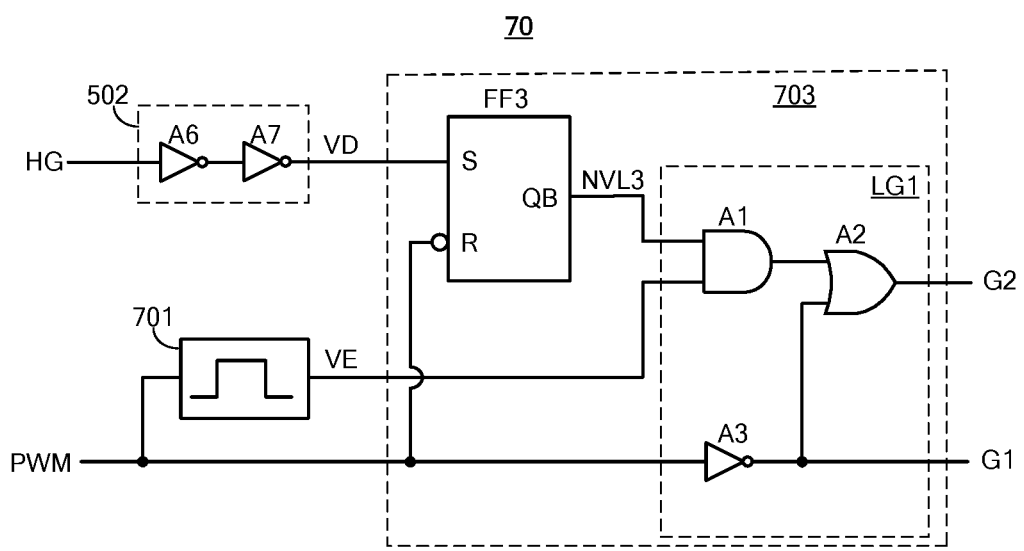
FIG. 7 schematically shows a driving control signal generating circuit 70 in accordance with an embodiment of the present invention.

FIG. 7 schematically shows a driving control signal generating circuit 70 in accordance with an embodiment of the present invention. The driving control signal generating circuit 70 comprises: a delay circuit 701, having an input terminal configured to receive the switching control signal PWM, and an output terminal configured to provide a delay signal VE, wherein a time delay between the switching control signal PWM and the delay signal VE equals to the first time period TP1; the second threshold circuit 502, having the input terminal configured to receive the power control signal HG, the output terminal configured to provide the second threshold detecting signal VD; and a logic circuit 703, having a first input terminal configured to receive the delay signal VE, a second input terminal configured to receive the second threshold detecting signal VD, a third input terminal configured to receive the switching control signal PWM, a first output terminal and a second output terminal configured to provide the first driving control signal G1 and the second driving control signal G2 respectively, wherein the first driving control signal G1 is generated based on performing a logic operation to the switching control signal PWM, and the second driving control signal G2 is generated based on performing a logic operation of the delay signal VE, the second threshold detecting signal VD, and the switching control signal PWM.

In the example of FIG. 7, the logic circuit 703 comprises: a third RS latch FF3, having a reset terminal "R" configured to receive the switching control signal PWM, a set terminal "S" configured to receive the second threshold detecting signal VD, and an output terminal configured to provide a third latch output signal NVL3 based on the switching control signal PWM and the second threshold detecting signal VD; and the logic gate circuit LG1, having the first input terminal configured to receive the third latch output signal NVL3, the second input terminal configured to receive the delay signal VE, the third input terminal configured to receive the switching control signal PWM, the first output terminal and the second output terminal configured to provide the first driving control signal G1 and the second driving control signal G2 respectively, wherein the first driving control signal G1 is generated based on performing a logic operation to the switching control signal PWM, and the second driving control signal G2 is generated based on performing a logic operation to the third latch output signal NVL3, the delay signal VE and the switching control signal PWM.

The first time period TP1 could be estimated when the specs of the application are known. Thus, in the example of FIG. 7, the delay circuit 701 provides the delay signal VE to pull down the second driving control signal G2 via the logic gate circuit LG1 after the first time period TP1 from the moment the first and second transistors are turned on.

The operation of the driving control signal generating circuit 70 will be illustrated with reference to FIGS. 3 and 7. As shown in FIG. 3, at time t1, the switching control signal PWM goes to logic 0. Then the first driving control signal G1 goes to logic 1 via the inverter A3 and the second driving control signal G2 goes to logic 1 via the OR gate A2. The third RS latch FF3 is reset, and the third latch output signal NVL3 flips to logic 1. However, the delay signal VE remains logic 0 at this time. Thus the output signal of the AND gate A1 is logic 0. At time t2, the switching control signal PWM flips to logic 1, and sets the first driving control signal G1 to logic 0 via the inverter A3. Because the delay signal VE keeps logic 0 at this time, the output signal of the AND gate A1 goes to logic 0. So after the OR gate A2, the second driving control signal G2 goes to logic 0. After the first time period TP1, i.e., at time t3, the delay signal VE flips to logic 1, and the third latch output signal NVL3 keeps logic 1. So the output signal of the AND gate A1 goes to logic 1. As a result, the second driving control signal G2 goes to logic 1 at time t3. From the time t2 to the time t3, the power control signal HG increases with a slow slew rate dv/dt. About at time t4, the power control signal HG reaches the threshold of the inverter A6. As a result, the second threshold detecting signal VD flips to logic 1 to set the RS latch FF3, and the third latch output signal NVL3 flips to logic 0, which turns the output signal of the AND gate A1 to logic 0. At this time, the output signal of the inverter A3 is logic 0. So the second driving control signal G2 is set to be logic 0 again via the OR gate A2. At time t5, the switching control signal PWM flips to logic 0, and sets the driving control signals G1 and G2 to logic 1 via the inverter A3, and the OR gate A2. Then another switching cycle begins and the operation repeats as shown in FIG. 3.

The above embodiments are shown for illustration of the present invention. As persons of ordinary skill in the art should know that, the logic circuit would vary as the logic forms of the input signals are changed. By teaching of the present invention, persons of ordinary skill in the art could produce their own logic circuits according to the application.

The present invention could be used with any switching circuit with at least one power transistor turned on and off to convert an input signal to an output signal.

While the above Detailed Description describes certain embodiments, the present invention is not limited to the features described and may be practice in many ways. Details of the system may vary in implementation, while still being encompassed by the present invention disclosed herein. Accordingly, the scope of the present invention encompasses not only the disclosed embodiments, but also all equivalent ways of practicing or implementing the present invention under the claims.

I claim:

1. A driver for driving a power transistor having a control terminal, a first terminal and a second terminal, the driver comprising:
    a first transistor, having a control terminal configured to receive a first driving signal, a first terminal coupled to a power source, a second terminal coupled to the control terminal of the power transistor; and
    a second transistor, having a control terminal configured to receive a second driving signal, a first terminal coupled to the power source, and a second terminal coupled to the control terminal of the power transistor; wherein
    (1) when the first transistor is turned on, the second transistor is simultaneously turned on, and wherein after the second transistor remains on for a first time period, the second transistor is turned off for a second time period during when a switching voltage at the second terminal of the power transistor is rising, and the second transistor is turned on after the second time period is over; and
    (2) when the first transistor is turned off, the second transistor is simultaneously turned off; wherein
    the second time period begins in response to a power control signal at the control terminal of the power transistor reaching a first power control signal threshold, and ends in response to the power control signal reaching a second power control signal threshold, and wherein the first power control signal threshold is higher than a turn on threshold of the power transistor, and the second power control signal threshold is higher than the first power control signal
    further comprising a driving control signal generating circuit wherein the driving control signal generating circuit comprises:
    a first threshold circuit, having a first input terminal configured to receive the switching voltage, a second input terminal configured to receive a first switching voltage threshold, and an output terminal configured to provide a first threshold detecting signal based on the switching voltage and the first switching voltage threshold;
    a second threshold circuit, having a first input terminal configured to receive the switching voltage, a second input terminal configured to receive a second switching voltage threshold, and an output terminal configured to provide a second threshold detecting signal based on the switching voltage and the second switching voltage threshold; and a logic circuit, having a first input terminal configured to receive the first threshold detecting signal, a second input terminal configured to receive the second threshold detecting signal, a third input terminal configured to receive a switching control signal, a first output terminal and a second output terminal configured to provide a first driving control signal and a second driving control signal respectively, wherein the first driving control signal is generated based on performing a logic operation to the switching control signal, and the second driving control signal is generated based on performing a logic operation to the first threshold detecting signal, the second threshold detecting signal and the switching control signal, wherein:

the first threshold circuit comprises a first comparator; and the second threshold circuit comprises a second comparator.

2. The driver of claim 1, wherein the logic circuit further comprises:

a first RS latch, having a set terminal configured to receive the first threshold detecting signal, a reset terminal configured to receive the switching control signal, and a non-inverting output terminal configured to provide a first latch output signal;

a second RS latch, having a set terminal configured to receive the second threshold detecting signal, a reset terminal configured to receive the switching control signal, and an inverting output terminal configured to provide a second latch output signal; and a logic gate circuit, having a first input terminal configured to receive the first latch output signal, a second input terminal configured to receive the second latch output signal, a third input terminal configured to receive the switching control signal, a first output terminal and a second output terminal configured to provide a first driving control signal and a second driving control signal respectively, wherein the first driving control signal is generated based on performing a logic operation to the switching control signal, and the second driving control signal is generated based on performing a logic operation to the first latch output signal, the second latch output signal and the switching control signal.

3. The driver of claim 1, further comprising a driving control signal generating circuit, wherein the driving control signal generating circuit comprises:

a first threshold circuit, having an input terminal configured to receive a power control signal, an output terminal configured to provide a first threshold detecting signal;

a second threshold circuit, having an input terminal configured to receive the power control signal, and an output terminal configured to provide a second threshold detecting signal; and a logic circuit, having a first input terminal configured to receive the first threshold detecting signal, a second input terminal configured to receive the second threshold detecting signal, a third input terminal configured to receive a switching control signal, a first output terminal and a second output terminal configured to provide a first driving control signal and a second driving control signal respectively, wherein the first driving control signal is generated based on performing a logic operation to the switching control signal, and the second driving control signal is generated based on performing a logic operation to the first threshold detecting signal, the second threshold detecting signal and the switching control signal.

4. The driver of claim 3, wherein the first threshold circuit comprises:

a current source, configured to provide a current; and a MOSFET, configured to receive the current provided by the current source, wherein the MOSFET has a control terminal configured to receive the power control signal.

5. The driver of claim 3, wherein the second threshold circuit further comprises one inverter or a plurality of inverters, and wherein when the second threshold circuit comprises the plurality of inverters, the plurality of inverters are coupled in a way that an output of a pre-stage inverter is coupled to an input of an adjacent post-stage inverter.

6. The driver of claim 3, wherein:

the first threshold circuit having a first comparator configured to receive the power control signal and a first power control threshold signal, and to provide the first threshold detecting signal based on a comparison result of the power control signal and the first power control threshold signal; and the first threshold circuit having a second comparator configured to receive the power control signal and a second power control threshold signal, and to provide the second threshold detecting signal based on a comparison result of the power control signal and the second power control threshold signal.

7. The driver of claim 1, further comprising a driving control signal generating circuit, wherein the driving control signal generating circuit comprises:

a delay circuit, having an input terminal configured to receive a switching control signal, and an output terminal configured to provide a delay signal, wherein a time delay between the switching control signal and the delay signal equals to the first time period;

a second threshold circuit, having an input terminal configured to receive the power control signal, and an output terminal configured to provide a second threshold detecting signal; and a logic circuit, having a first input terminal configured to receive the delay signal, a second input terminal configured to receive the second threshold detecting signal, a third input terminal configured to receive the switching control signal, a first output terminal and a second output terminal configured to provide a first driving control signal and a second driving control signal respectively, wherein the first driving control signal is generated based on performing a logic operation to the switching control signal, and the second driving control signal is generated based on performing alogic operation to the delay signal, the second threshold detecting signal and the switching control signal.

8. The driver of claim 7, wherein the second threshold circuit comprises one inverter or a plurality of inverters, wherein when the second threshold circuit comprises the plurality of inverters, the plurality of inverters are coupled in a way that an output of a pre-stage inverter coupled to an input of an adjacent post-stage inverter.

9. A switching converter, comprising:

a first power transistor, having a control terminal configured to receive a power control signal, a first terminal configured to receive an input voltage, and a second terminal coupled to a switching node of the switching converter;

a driver having a first input terminal configured to receive a first driving signal, a second input terminal configured to receive a second driving signal, and an output terminal configured to provide the power control signal to the control terminal of the first power transistor, wherein the driver comprises a first transistor turned on and off by the first driving signal, and a second transistor turned on and off by the second driving signal; wherein, (1) when the first transistor is turned on, the second transistor is simultaneously turned on, and wherein after the second transistor remains on for a first time period, the second transistor is turned off for a second time period during when a switching voltage at the second terminal of the power transistor is rising, and the second transistor is turned on after the second time period is over; and (2) when the first transistor is turned off, the second transistor is simultaneously turned off; wherein the second time period begins in response to a power control signal at the control terminal of the power transistor reaching a first power control signal threshold, and ends in response to the power control signal reaching a second power control signal threshold, and wherein the first power control signal threshold is higher than a turn on threshold of the power transistor, and the second power control signal threshold is higher than the first power control signal;

further comprising a driving control signal generating circuit, wherein the driving control signal generating circuit comprises:

a first threshold circuit, having a first input terminal configured to receive the switching voltage at the switching node, a second input terminal configured to receive a first switching voltage threshold, and an output terminal configured to provide a first threshold detecting signal based on the switching voltage and the first switching voltage threshold;

a second threshold circuit, having a first input terminal configured to receive the switching voltage, a second input terminal configured to receive a second switching voltage threshold, and an output terminal configured to provide a second threshold detecting signal based on the switching voltage and the second switching voltage threshold; and a logic circuit, having a first input terminal configured to receive the first threshold detecting signal, a second input terminal configured to receive the second threshold detecting signal, a third input terminal configured to receive a switching control signal, a first output terminal and a second output terminal configured to provide a first driving control signal and a second driving control signal respectively, wherein the first driving control signal is generated based on performing a logic operation to the switching control signal, and the second driving control signal is generated based on performing a logic operation to the first threshold detecting signal, the second threshold detecting signal and the switching control signal;

further wherein the first threshold circuit is a first comparator and the second threshold circuit is a second comparator.

10. The switching converter of claim 9, further comprising a driving control signal generating circuit, wherein the driving control signal generating circuit comprises:

a delay circuit, having an input terminal configured to receive a switching control signal, and an output terminal configured to provide a delay signal, wherein a time delay between the switching control signal and the delay signal equals to the first time period;

a second threshold circuit, having an input terminal configured to receive the power control signal, an output terminal configured to provide a second threshold detecting signal; and a logic circuit, having a first input terminal configured to receive the delay signal, a second input terminal configured to receive the second threshold detecting signal, a third input terminal configured to receive the switching control signal, a first output terminal and a second output terminal configured to provide a first driving control signal and a second driving control signal respectively, wherein the first driving control signal is generated based on performing a logic operation to the switching control signal, and the second driving control signal is generated based on performing a logic operation to the delay signal, the second threshold detecting signal, and the switching control signal.

* * * * *